Nov. 10, 1953 P. P. GALLO 2,659,070
GAUGE AND WARNING LIGHT COMBINATION
Filed Sept. 4, 1951
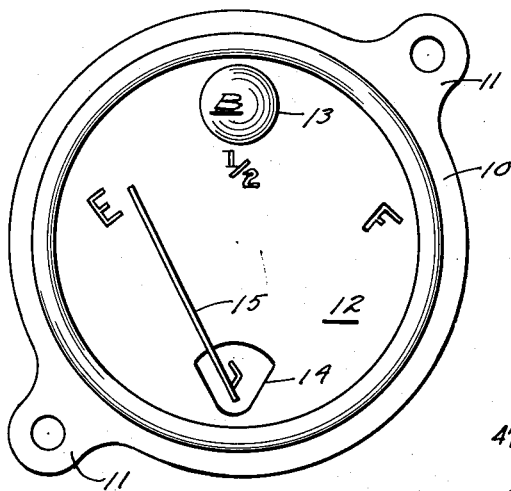
Fig. 1.
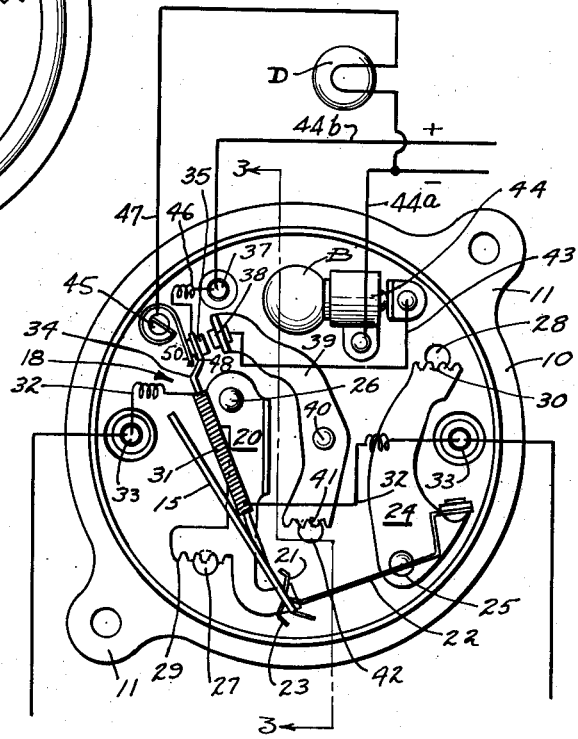
Fig. 2.
Fig. 3.
INVENTOR.
Paul P. Gallo.
BY W. B. Harpman
ATTORNEY.

Patented Nov. 10, 1953

2,659,070

UNITED STATES PATENT OFFICE 2,659,070

GAUGE AND WARNING LIGHT COMBINATION

Paul P. Gallo, Youngstown, Ohio, assignor of twenty-five per cent to E. A. Renner, Youngstown, Ohio Application September 4, 1951, Serial No. 245,061

3 Claims. (Cl. 340—266)

This invention relates to gauges and more particularly to gauges used in indicating the quantity of gasoline in an automotive vehicle tank, the temperature of the water in the automotive vehicle radiator, the operation of the oil pump of the automotive vehicle and the ammeter in the electrical system thereof.

The principal object of the invention is the provision of a gauge incorporating indicia and an element movable with respect thereto together with a warning light operable by the mechanism of the gauge.

A further object of the invention is the provision of a simple and inexpensive combination gauge and warning light.

A still further object of the invention is the provision of a combination gauge and warning light which will operate to attract attention to the gauge at a predetermined point thereon.

The combination gauge and warning light disclosed herein comprises a simple and efficient device enabling the condition of the fuel tank, oil pump, water temperature or ammeter of an automotive vehicle to be readily determined in the usual manner by visual observation of the gauge and its associated indicia and at the same time provides in combination therewith a warning light operable when the gauge reaches a certain predetermined point to attract the attention of the operator of the motor vehicle so that in effect a dual signal is given of a certain predetermined condition.

As disclosed herein, a gasoline gauge forms the preferred embodiment of the invention with an associated warning light operable at such times as the gasoline gauge reaches near empty position.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a plan view of the combination gauge and warning light.

Figure 2 is a view of the mechanism of the gauge and warning light shown in Figure 1.

Figure 3 is a vertical section taken on line 3—3 of Figure 2.

By referring to the drawings and Figure 1 in particular it will be seen that the gauge comprises a body or casing member 10 having oppositely disposed mounting lugs 11 thereon and normally provided with a dial 12 covering the majority of the area of the gauge. The dial 12 has indicia such as E, ½ and F thereon in an arcuate pattern across the face thereof and a pair of openings 13 and 14 near the upper and lower portions, respectively. The opening 13 is adapted to register with a colored incandescent bulb B or, alternately, carry a colored lens while the opening 14 permits an indicator hand 15 to extend from the mechanism of the gauge behind the dial 12 outwardly through the opening 14 where it moves with respect to said indicia.

In Figure 2 of the drawings the gauge is shown with the dial 12 removed and it will be observed that the indicator hand 15 has a rearwardly projecting body formed thereon, the rearwardly projecting body being indicated by the numeral 16 and is provided with a rectangular opening 17 by means of which the hand is mounted in the gauge.

The means mounting the hand 15 comprise an inverted U-shaped bimetallic element generally designated 18, one leg 18ª of which is secured at a point 19 to the lower end of an adjustment lever 20 and the other leg 18ᵇ of the bimetallic member has at its outer end a hook 21 thereon engaged in the opening 17 of the rearwardly projecting body 16 of the hand 15.

An arm 22 having a hook 23 is adjustably positioned in the casing member 10 by a secondary lever 24 which is pivoted as at 25 to the gauge body or casing member 10. The hook 23 is engaged in the opening 17 in the rearwardly projecting body 16 of the hand 15 and the hand 15 is thereby held in desired position in the casing member. The positioning of the hand 15 is controlled by the movement of the lever 20 and the secondary lever 24. The lever 20 is pivoted to the body or casing member 10 of the gauge by a pivot 26. Both of these levers 20 and 24 may be adjusted by means of openings 27 and 28 formed in the casing member 10 and in registry with racks 29 and 30 formed on the levers 20 and 24, respectively. It will thus be seen that the hand 15 may be positioned for proper registry with respect to the indicia on the dial 12 by such adjustment.

In order that the bimetallic element 18 may impart movement to the hand 15, a heating coil 31 is wrapped around one leg 18ᵇ thereof and is connected by flexible connectors 32 with terminals 33 on the casing member 10. When a varying current is passed through the conductors 32 and the coil 31, the resultant motion of the bimetallic element 18 causes the free arm thereof to move and hence imparts such movement to the hand 15. The upper inner end of the inverted U-shaped bimetallic element 18 is provided with a longitudinally extending extension 34 carrying a contact 35 and which contact 35 is connected by a flexible conductor 46 with a contact 37 on the casing member 10.

A movable contact 38 is adjustably positioned with respect to the contact 35 by means of a third lever 39 pivoted at 40 to the casing member 10 and provided with a rack 41 registering with an opening 42 in the casing member 10 so that it may be adjusted. A conductor 43 extends from the movable contact 38 to one terminal of a socket 44 holding the bulb B. Leading from the other terminal of the lamp socket 44 is one leg 44ᵃ of a circuit for energizing the lamp B, the other leg of said circuit designated 44ᵇ being connected to the contact 37. It will therefore be observed that upon movement of the bimetallic element to the right and the corresponding movement of the hand 15 to the left to a point adjacent the desired indicia thereon, the contacts 35 and 38 will be closed and the bulb B energized thereby providing a dual warning.

It will further be observed that at all other times the bulb B is not energized and the gauge operates in the usual manner to indicate the amount of fuel, temperature, oil pressure as the case may be.

The invention also comprehends in conjunction with the gauge structure and warning signal hereinbefore described, the provision of a branch or secondary circuit controlled by the bimetallic element 18 and in which branch circuit is included an incandescent lamp D to be arranged to illuminate the instrument board of an automobile, the branch or secondary circuit including a contact 48 on an arm 50 connected with a post 45 on the casing member 10 and a conductor 47 connected with said post and with the leg 44ᵃ of the circuit for the warning lamp B. The contact 48 is so arranged as to normally engage the extension 34 of the bimetallic element 18 to close the branch circuit through the conductor 47. Movement of the bimetallic element 18 to the right, as hereinbefore described, causes the disengagement of the extension 34 from the contact 48, thus breaking the secondary circuit through the conductor 47 so that upon the lamp B being illuminated, the lamp D will simultaneously be extinguished.

It will occur to those skilled in the art that as an alternate to the formation of the device with the opening 13 in the dial 12, the gauge may be provided with a dome-shaped, transparent lens, the periphery of which registers in a slot and is, therefore, edge-lighted by the bulb B in the gauge. In either event, the dual action combination gauge and warning light operates efficiently for its indicated purpose. Those skilled in the art will recognize that it will operate regardless of the actuating principles of the gauge itself whether the same be by bimetallic motion, as herein disclosed, or by magnetic attraction as used in other gauges known in the art, or by other mechanical or hydraulic actuating means, also known in the art.

It will thus be seen that the several objects of the invention have been met by the gauge and warning light combination disclosed herein.

Having thus described my invention, what I claim is:

1. A gauge including a casing member, a dial on the casing member having indicia thereon, a hand cooperating with the dial, a substantially U-shaped bimetallic element supported at one end of one leg thereof on the casing member, the other leg of the bimetallic element being connected at its outer end to said indicating hand to impart movement thereto, a heating coil about said last mentioned leg of the bimetallic element adapted to be energized in accordance with the condition to be indicated, a contact mounted on the casing member near the inner end of the bimetallic element, said bimetallic element having a contact thereon at its inner end adapted to cooperate with said first mentioned contact, an incandescent lamp mounted within the casing member, and a circuit for energizing said lamp, said contacts being included in said circuit, the contact on said bimetallic element being moved into contact with said contact on the casing member to close said circuit and energize said lamp upon predetermined movement of said bimetallic element.

2. A gauge including a casing member, a dial on the casing member having indicia thereon, a hand cooperating with the dial, a substantially U-shaped bimetallic element supported at one end of one leg thereof on the casing member, the other leg of the bimetallic element being connected at its outer end to said indicating hand to impart movement thereto, a heating coil about said last mentioned leg of the bimetallic element intermediate the ends thereof adapted to be energized in accordance with the condition to be indicated, a contact mounted on the casing member near the inner end of the bimetallic element, a second contact mounted on the casing member, said substantially U-shaped bimetallic element having a portion extending longitudinally from its inner free end provided with a contact thereon flexibly connected with said second contact and adapted to cooperate with said first mentioned contact, an incandescendent lamp mounted within the casing member, and a circuit for energizing said lamp, said contacts being included in said circuit, the contact on said bimetallic element being moved into contact with said contact on the casing member to close said circuit and energize said lamp upon predetermined movement of said bimetallic element.

3. A gauge adapted to be mounted on the instrument board of an automobile and including a casing member, a dial on the casing member having indicia thereon, a hand cooperating with the dial, a substantially U-shaped bimetallic element supported at one end of one leg thereof on the casing member, the other leg of the bimetallic element being connected at its outer end to said indicating hand to impart movement thereto, a heating coil about said last mentioned leg of the bimetallic element intermediate the ends thereof adapted to be energized in accordance with the condition to be indicated, a contact mounted on the casing member near the inner end of the bimetallic element, a second contact mounted on the casing member, said substantially U-shaped bimetallic element having a portion extending longitudinally from its inner free end provided with a contact thereon flexibly connected with said second contact and adapted to cooperate with said first mentioned contact, an incandescent lamp mounted within the casing member, and a circuit for energizing said lamp, said contacts being included in said circuit, the contact on said bimetallic element being moved into contact with said contact on the casing member to close said circuit and energize said lamp upon predetermined movement of said bimetallic element, a third contact on the casing member, a branch conductor leading from said third contact to one leg of said circuit, and a second incandescent lamp included in said branch conductor adapted to be mounted to illuminate the instrument board of the automobile, the longitudinally extending portion on the inner free end of the bimetallic element normally engaging said third contact to close said circuit through the second lamp when the contact on the bimetallic element is out of engagement with the first mentioned contact and the circuit through said first mentioned incandescent lamp is broken.

PAUL P. GALLO.

References Cited in the file of this patent

UNITED STATES PATENTS

| Number | Name | Date |
| --- | --- | --- |
| 2,279,140 | Kellen | Apr. 7, 1942 |
| 2,322,703 | Polin | June 22, 1943 |
| 2,355,237 | Pethes, Jr. | Aug. 8, 1944 |
| 2,520,899 | Smulski | Aug. 29, 1950 |
| 2,570,125 | Hoare et al. | Oct. 2, 1951 |
| 2,605,339 | Connolly | July 29, 1952 |